Feb. 9, 1937. T. G. CECKA 2,070,508
FEED REGULATOR AND SEPARATOR
Filed Oct. 23, 1933   2 Sheets—Sheet 1
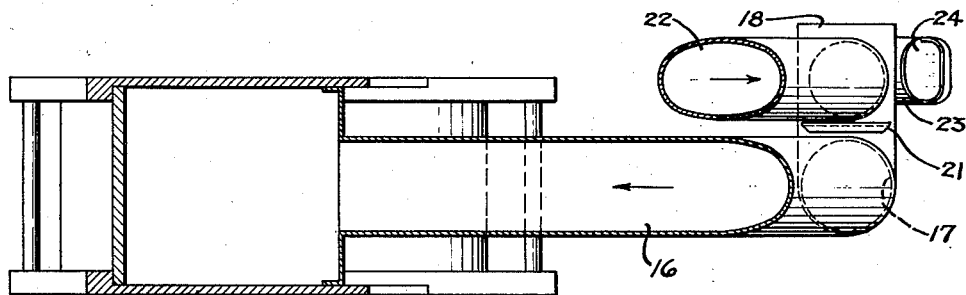
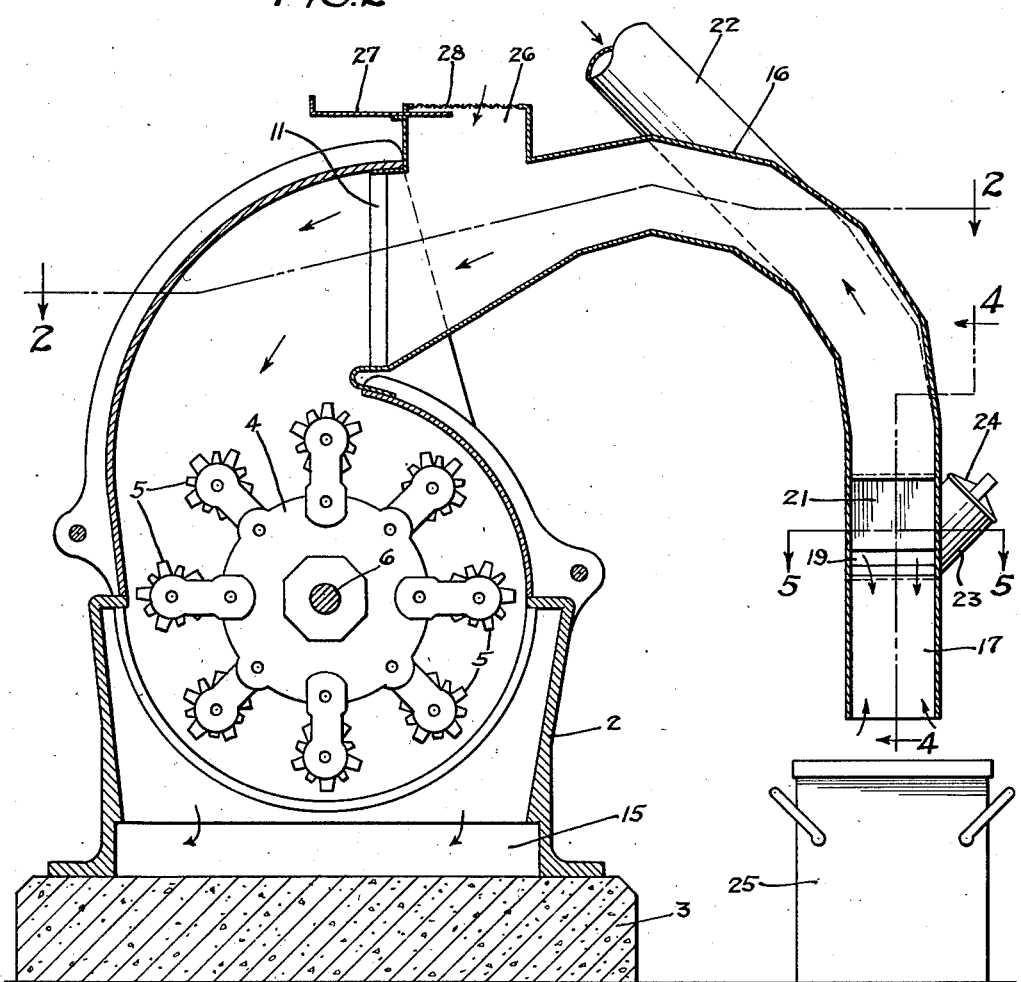
Inventor
THOMAS G. CECKA Feb. 9, 1937.  T. G. CECKA  2,070,508
FEED REGULATOR AND SEPARATOR
Filed Oct. 23, 1933  2 Sheets-Sheet 2
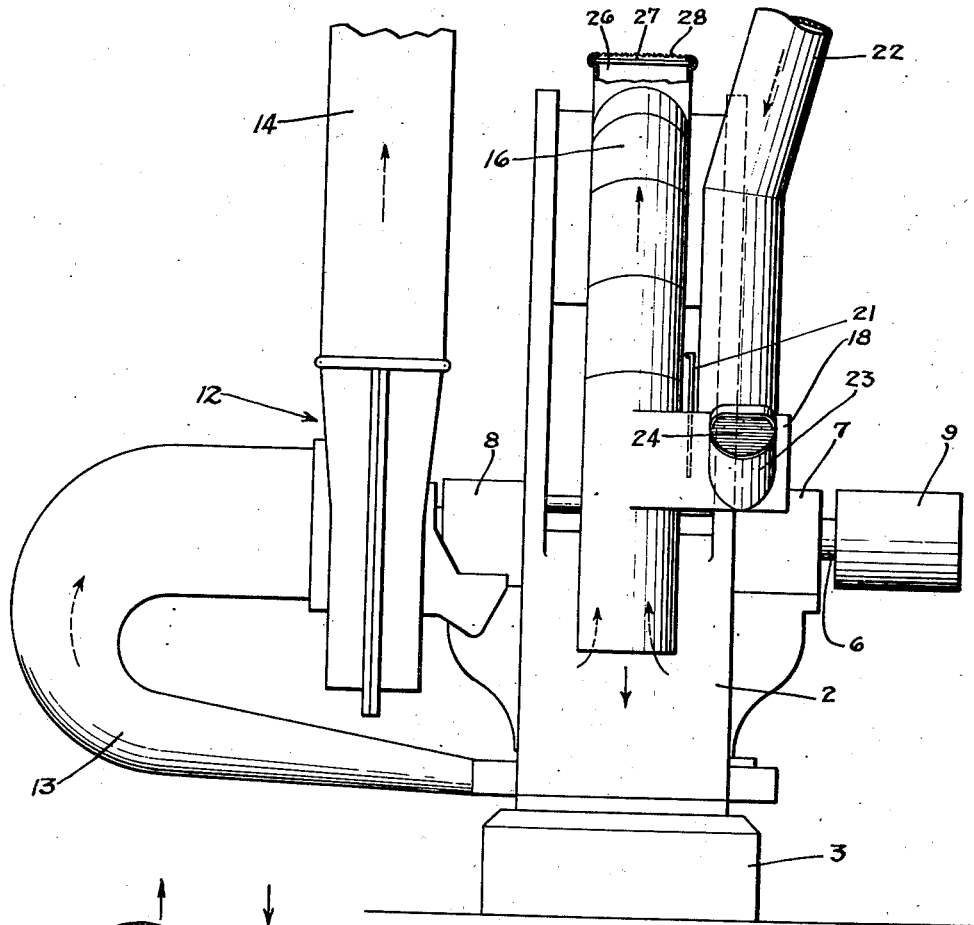
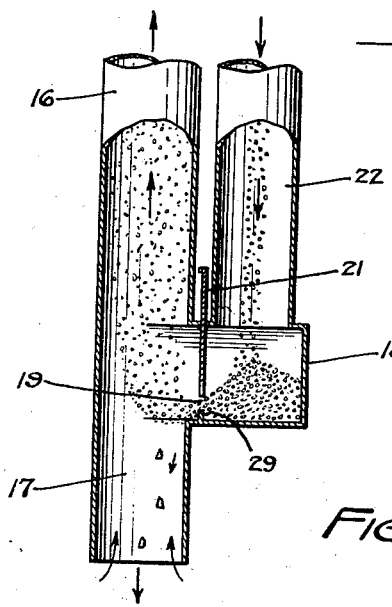
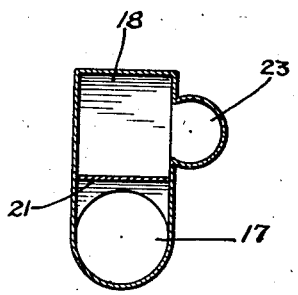
Inventor
THOMAS G. CECKA
By Paul, Paul Moore
ATTORNEYS Patented Feb. 9, 1937

2,070,508

UNITED STATES PATENT OFFICE 2,070,508

FEED REGULATOR AND SEPARATOR

Thomas G. Cecka, Buffalo, N. Y., assignor to International Milling Company, Buffalo, N. Y., a corporation of Delaware Application October 23, 1933, Serial No. 694,786

4 Claims. (Cl. 209—139)

This invention relates to new and useful improvements in feed regulators adapted for use in connection with grinding mills, and more particularly to such an apparatus which operates to uniformly feed the selected material into the mill and, at the same time, to separate foreign matter from the material such as stones, and other refuse, to prevent the latter from being delivered into the mill.

An object of the invention is to provide a combination feed regulator and stone trap adapted to be connected to the feed intake of a mill and comprising an upright separating chamber into which the material is delivered against a flow of air, the velocity of which may be controlled to cause only the selected lighter material to be drawn into the mill, while the heavier material such as stones, and other refuse, is discharged from the lower end of the chamber into a suitable receptacle.

A further object is to provide an apparatus of the class described comprising an upright separating chamber having its upper end connected to one end of a suction conduit, the opposite end of which is connected to the feed intake of a mill, and a suitable receiving chamber or box being provided at one side of the separating chamber and communicating therewith through an opening which may be varied in size to regulate the feeding of the material into the separating chamber, and the upper or discharge end of the suction conduit being connected with a suitable suction means whereby air is drawn upwardly through the separating chamber and said conduit, to thereby convey the selected lighter weight material upwardly through said conduit and chamber to the mill, while the heavier and undesirable material is discharged from the lower end of the separating chamber as refuse, and means being provided for controlling the velocity of the air flowing upwardly through the separating chamber and said conduit to thereby control the degree of separation of said materials.

A further object is to provide a feed regulator and stone trap comprising an upright separating chamber provided with an open bottom and having its upper end connected to one end of a suction conduit, the opposite end of which is connected to the feed intake of a mill, which mill is provided with a suitable suction fan for drawing air into the mill housing, and whereby the material is drawn upwardly through the separating chamber and said conduit into the mill, and said chamber and suction conduit being substantially cylindrical in cross-section and of substantially the same diameter to prevent the formation of dead air pockets and eddy currents, and a feed box being arranged adjacent to one side of the separating chamber which is in direct communication therewith through an elongated horizontal opening which may be varied in size to regulate the feeding of the material from the feed box into the separating chamber, and the suction conduit being provided adjacent its upper end with an air intake for admitting additional air thereinto, and which may be varied in size to control the velocity of the air flowing upwardly through said separating chamber and conduit, whereby an accurate separation may be obtained of the materials delivered into the separating chamber, regardless of whether the feed is heavy or light, and the conduit adjacent to the intake at its upper end being enlarged in size to thereby prevent the creation of eddy currents and whereby the selected material will be uniformly fed into the mill from said conduit.

A further object is to provide a combination feed regulator and stone trap comprising an upright separating chamber having an air inlet at its bottom and having its upper end connected to one end of a suction conduit, the opposite end of which is connected to the feed intake of a suction type mill, and means being provided adjacent to said separating chamber for uniformly feeding the material to be separated thereinto, and means being provided adjacent the discharge end of said conduit for admitting additional air thereinto, to thereby reduce the velocity of the air flowing upwardly through said separating chamber and conduit, and separate means being provided for regulating the feeding of the material into the separating chamber and for controlling the admission of additional air into the conduit, whereby the desired degree of separation may be obtained between the light and heavy materials delivered into the separation chamber, and said regulating and control means being operable independently of each other and so arranged that actuation thereof does not affect the shape of the passage through said separating chamber and conduit, and whereby the flow of air through said passage will always be uniform and even, regardless of the velocity of said air.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a vertical sectional view through a conventional type of hammer mill showing the combination feed regulator and stone trap connected to the material receiving opening thereof;

Figure 2 is a sectional plan view on the line 2—2 of Figure 1, with some of the parts omitted;

Figure 3 is an end view of Figure 1, showing the usual fan housing provided on the mill;

Figure 4 is a detail sectional view on the line 4—4 of Figure 1, showing the connection between the separating chamber and receiving chamber or feed box into which the material to be separated is delivered, and from which it is fed into the separating chamber; and Figure 5 is a sectional plan view on the line 5—5 of Figure 1.

In the selected embodiment of the invention here shown for purposes of disclosure, there is illustrated in Figures 1 and 2, a grinding mill of the hammer type, comprising the usual housing 2 supported upon a suitable foundation 3, and having a rotor 4 mounted therein shown provided with the usual grinding hammers or elements 5. The rotor is supported upon a suitable shaft 6 mounted in bearings 7 and 8, and may be driven by a suitable belt drive, not shown, connected to the pulley 9, shown in Figure 3.

The mill is shown provided at its upper portion with the usual material receiving opening or intake 11, and has a suitable suction fan generally indicated by the numeral 12. This fan is operatively connected to the shaft 6, and its housing has a connection 13 connecting it with the lower portion of the mill, as shown in Figure 3. The fan exhausts through a pipe 14 which conveys the ground material to a suitable receiving means, not shown. In the type of mill here shown, it will be noted that the air is drawn into the mill through the intake opening 11 and circulates downwardly through an elongated opening 15, which constitutes the mouth of the connection 13, as will readily be understood by reference to Figures 1 and 3. The above described mechanism is old and well-known, and forms no part of the present invention.

The main feature of the present invention resides in the means provided for feeding the selected lighter material into the mill, and, as shown in Figure 1, comprises a suction conduit 16 having its discharge end connected to the intake 11 of the mill. In the arrangement shown in Figure 1, the suction tube extends outwardly from the mill intake 11, and then curves downwardly and terminates at its lower end in a separating chamber 17 which is of substantially the same diameter as the suction conduit 16 so as to provide an unobstructed and eddyless passage for the material drawn upwardly through the separating chamber and said suction conduit.

The means for delivering the material to be separated into the separating chamber 17, is best shown in Figure 4, and comprises a receiving chamber or box 18 arranged adjacent to one side of the separating chamber 17 and communicating therewith through an elongated opening 19. This opening may be varied in size by a suitable slide 21, whereby the feeding of the material from the box 18 into the chamber 17 may be regulated. A suitable material supply pipe 22 is provided for delivering the material into the box 18.

A suitable hand hole 23 is provided on one side of the feed box 18, and has a cover 24 which may readily be removed to permit inspection of the feeding of the material from the box 18 into the separating chamber 17, and also whereby access may be had to the interior of the separating chamber.

The separating chamber 17 is open at its bottom, as shown in Figure 1, and air is drawn upwardly through said chamber and through the suction conduit 16 by the action of the mill fan 12, as indicated by the arrows in Figure 1, and carries the lighter selected or usable material upwardly through the conduit 16 and delivers it into the mill. The heavier materials, such as stones and other undesirable material which is too heavy to be conveyed upwardly by the air flowing through the chamber 17, is discharged from the lower end of said chamber into a suitable receptacle 25, shown in Figure 1.

To control the degree of separation of the material delivered into the separating chamber 17, means is provided at the upper end of the suction conduit 16 adjacent the feed opening 11 of the mill, for admitting additional air into said conduit, to thereby reduce the velocity of air flowing through the chamber 17 and conduit 16. Such means is best shown in Figure 1, and comprises an air intake 26, the size of which may be varied by means of a slide 27 mounted in suitable guides provided in the walls of the air intake 26. A screen 28 prevents foreign matter from being drawn into the mill through the air intake 26.

In the operation of the novel combination feed regulator and stone trap herein disclosed, the material to be separated is delivered into the feed box 18 from the feed pipe 22. The feed box 18 preferably has a flat bottom, and a small upstanding wall portion 29 may be provided upon the bottom wall thereof in alinement with the slide 21, which extends the full length of the opening 19, and over which the material flows or spills in a thin sheet into the separating chamber 17, as shown in Figure 4. The velocity of air traveling upwardly through the separating chamber 17 and conduit 16 is controlled by manipulation of the slide 27, so that only the desired lighter material is drawn upwardly through the conduit 16 and into the mill, while the heavier undesirable material, such as stones and other refuse, is precipitated into the receptacle 25 from the lower open end of the chamber 17, against the action of the upwardly flowing air current in the chamber 17. By increasing the size of the air intake 26, the velocity of the air traveling through the chamber 17 and conduit 16 is reduced, and, conversely, when the air intake 26 is reduced in size, the velocity of the air flowing through the chamber is increased. It will thus be seen that by manipulation of the slide 27, an accurate degree of separation may be obtained of the lightest heavier materials delivered into the chamber 17 from the feed box 18.

It is also to be noted that the discharge end of the conduit 16 is enlarged vertically adjacent to the air intake 26, whereby the air drawn into the conduit at this point will not tend to form eddy currents in the conduit but, in addition to reducing the velocity of the air traveling through the chamber 17 and conduit 16, it will act to uniformly distribute the material as it is fed into the feed mill, whereby the grinding elements 5 of the rotor 4 will wear evenly the entire width of the mill, which will tend to maintain the mill in perfect balance. The conduit 16 is also formed with a long sweeping curve to prevent corners and angles which might form dead air pockets and cause eddy currents.

The particular shape of the separating chamber 17 and conduit 16, and also in the particular arrangement of the means for regulating the feeding of the material into the chamber 17, and for controlling the velocity of the air therethrough, is very important in the successful operation of the mill, in that by thus constructing the apparatus, an accurate separation may be obtained of the materials delivered into the separating chamber from the feed box 18. The entire apparatus is very simple and inexpensive in construction, and may readily be connected to the feed intake openings of ordinary grinding mills without altering their construction.

I claim as my invention:

1. In a feed regulator and stone trap of the class described, a cylindrical separating chamber having an open bottom, a suction conduit having one end connected to the upper end of said chamber and having its opposite end adapted to be connected to a feed mill, means for drawing air upwardly through said chamber and conduit into the mill, a feed box at one side of said separating chamber communicating therewith through an elongated, horizontal feed opening, means for delivering material to said box, means for varying the size of said feed opening to regulate the feeding of the material into said chamber, an air intake in a wall of said conduit adjacent its discharge end, a slide for varying the size of said air intake to thereby control the velocity of the air flowing upwardly through said chamber and conduit, and whereby only selected lighter material is drawn upwardly through the conduit and into the feed mill, while the heavier unusable material, such as stones and other refuse, is discharged by gravity from the lower open end of the chamber, and the upper end portion of the suction conduit having a bottom wall which is inclined downwardly in the direction of air flow, thereby to gradually enlarge the conduit, said air control valve being disposed over and said inclined bottom wall.

2. In a feed regulator and stone trap of the class described, an upright, elongated separating chamber having an open bottom, a suction conduit having one end connected to the upper end of said chamber and having its opposite end adapted for connection to a suitable receiving means, said chamber and conduit being of substantially the same size and shape cross-sectionally, to thereby eliminate dead air pockets and eddy currents, means for drawing air upwardly through said chamber and conduit into said receiving means, a closed feed box adjacent to said separating chamber having a horizontal bottom and communicating with said chamber through an elongated, horizontal feed opening, a pipe connected to said feed box for delivering material thereto, means for varying the size of said feed opening to regulate the feeding of the material into said chamber, an air intake in the upper wall of said conduit adjacent to the discharge end thereof, and a slide for varying the size of said air intake to thereby control the velocity of the air flowing upwardly through said chamber and conduit, and whereby only selected lighter material is drawn upwardly through the conduit to the receiving means, while the heavier unusable material, such as stones, and other refuse, is discharged by gravity from the lower open end of the chamber, and said conduit enlarging in size vertically from said air intake to its discharge end, thereby to eliminate eddy currents and cause even distribution of the material into the receiving means.

3. In a combined feed regulator and stone trap for feed mills, a suction conduit having an upright portion whose lower end is open to the atmosphere and the upper portion of which is gradually curved to provide a portion which is substantially horizontally disposed and whose bottom wall is inclined downwardly to enlarge the discharge end of the conduit to correspond substantially to the receiving opening of the feed mill, a feed box adjacent the lower end of said conduit and communicating therewith, means for delivering material into said feed box, means for regulating the flow of material from the feed box into the conduit, an air intake for said conduit disposed above said inclined bottom wall adjacent to the receiving opening of the feed mill, means for varying the size of said air intake to control the suction through the conduit, and whereby only selected material is drawn upwardly therethrough and delivered into the mill, and said conduit extending upwardly from the feed box in a sweeping curve to thereby eliminate sharp corners and obstructions, whereby air and material may be drawn upwardly therethrough and delivered into the mill without turbulence, and whereby the material is uniformly delivered into the mill.

4. In combination with a feed mill having an enlarged material receiving opening and means for drawing air through said opening into the mill, a feed regulator comprising a conduit of relatively smaller cross-sectional area than said receiving opening and having one end gradually enlarged to correspond to the feed opening of the mill and connected thereto, said conduit extending outwardly from the mill and curving downwardly and having its opposite end substantially vertically disposed and open to the atmosphere, a feed pipe connected to said conduit above the lower end thereof, means for controlling the flow of material from the feed pipe into the conduit, and an air intake in the upper wall of the conduit adjacent to the feed opening of the mill through which air may be drawn from the atmosphere into the conduit, thereby to control the suction through the conduit, and whereby only the desired material is delivered into the mill, said intake being disposed at an elevation above the upper wall of the conduit, whereby an expansion chamber is provided therebeneath to prevent the air from rushing directly into the suction pipe and creating a turbulence therein, and whereby the material may be uniformly distributed into the mill.

THOMAS G. CECKA.